G. O. DEGENER.
COMBINED TYPE WRITING AND COMPUTING MACHINE.
APPLICATION FILED DEC. 11, 1911.

1,256,985.

Patented Feb. 19, 1918.
2 SHEETS—SHEET 1.

WITNESSES:
F. C. Alexander
Julius Dickstine

INVENTOR:
Gustave O. Degener
BY B. C. Stickney
ATTORNEY

G. O. DEGENER.
COMBINED TYPE WRITING AND COMPUTING MACHINE.
APPLICATION FILED DEC. 11, 1911.
1,256,985.
Patented Feb. 19, 1918.
2 SHEETS—SHEET 2.
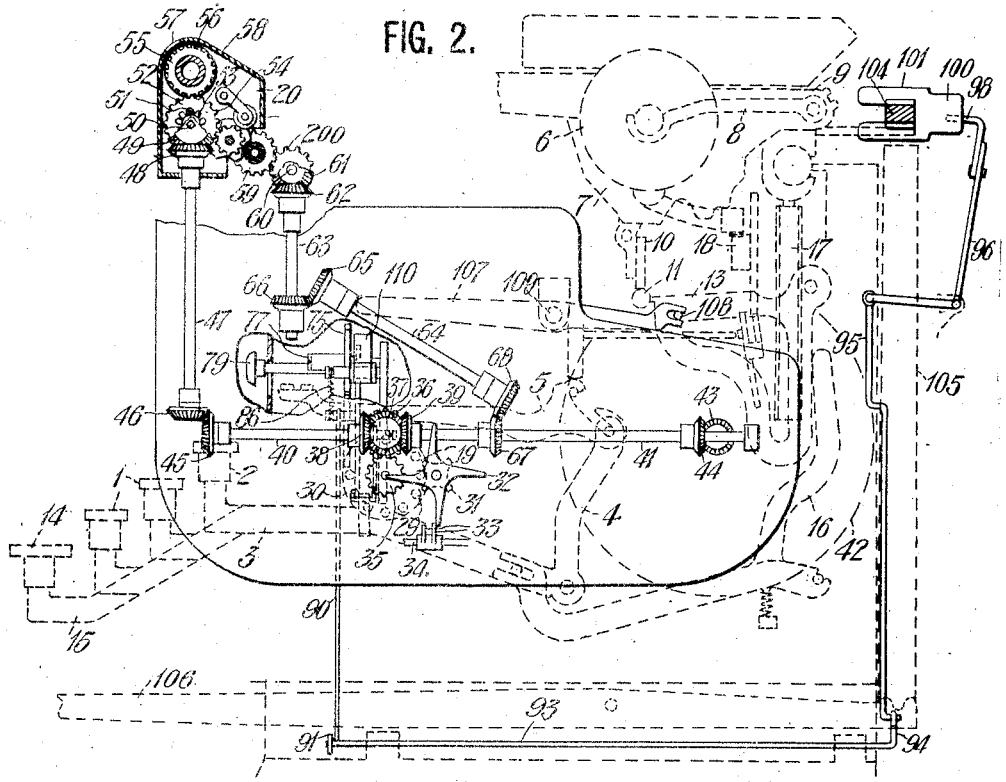
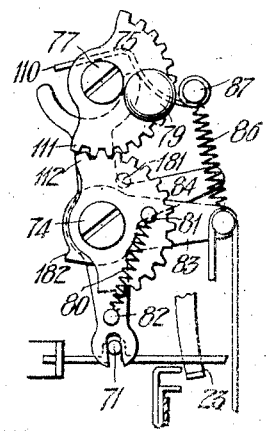
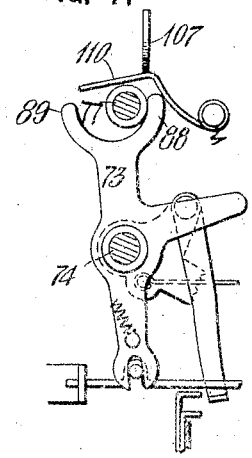
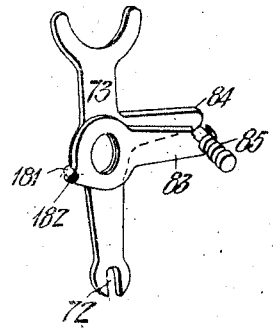
WITNESSES:
F. C. Alexander
Julius Duchstine
INVENTOR:
Gustave O. Degener
BY
D. C. Stickney
ATTORNEY

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,256,985.   Specification of Letters Patent.   Patented Feb. 19, 1918.

Application filed December 11, 1911. Serial No. 664,961.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to a computing machine connection-control of use in connection with a combined typewriting and computing machine of the Underwood-Wright type.

A feature of this invention consists in a manual means for rendering the computing mechanism capable of connection to the numeral keys of the typewriting mechanism by an automatic mechanism brought in play at predetermined points in the movement of the carriage of the typewriting mechanism, corresponding to columns on the work sheet in which it is desired to compute. The connecting mechanism is of a yieldable character, so that the connection can be interrupted, even when the automatic mechanism has effected a connection, by means of certain devices brought in play at the shifting of the platen of the typewriting mechanism to write upper case characters.

In the form used to illustrate this invention, the numeral keys are connectible by hooks to valuating escapement mechanism of the computing mechanism, whereby a master wheel of a computing head is given a certain rotation, the amount of which corresponds to the particular key struck. All of the hooks may be operatively connected to a shifter which can manipulate them into and out of coöperative engagement with the numeral keys of the typewriting mechanism. A manual controller may be operated to its active position, whereby it tends, through the intermediary of a spring, to pull the hooks into active engagement with the numeral keys. This tendency, however, is overcome by a stronger spring, which prevents the connection of the hooks to the numeral keys. The tension of the latter spring may be overcome at predetermined points corresponding, if desired, to certain columns on the work sheet on the carriage, by providing the carriage with tappets, which, when such columns are opposite the printing point of the typewriter, will actuate linkages connected so as to overcome the tension of the second-mentioned spring, and in fact, to aid the pull of the first-mentioned spring so that the hooks will be positively drawn into active connection with the numeral keys.

Means is provided, however, in the case where the platen frame bearing the platen with the work sheet is manipulated to write upper case characters, to disconnect the hooks from engagement with the numeral keys, even while one of the tappets is in its effective position to cause a connection of the hooks to the numeral keys. To accomplish this, the first-mentioned spring will yield a sufficient amount to permit the movement of the shifter to a position to disconnect the hooks from the numeral keys.

The manual controller above-mentioned can be shifted to a position where it does not tend to bring the hooks into engagement with the numeral keys and where the tappet actuated mechanism will be ineffective to bring about the connection of the hooks to the numeral key mechanism.

Other features and advantages will hereinafter appear.

In the accompanying drawings,

Fig. 2 is a diagrammatic side view in elevation partly in section.

Fig. 6 is a view somewhat similar to Figs. 3 and 4, showing the manual controller in its inactive position in which it does not tend to bring the hooks into active connection with the numeral keys, and also in which the carriage-controlled means cannot connect the hooks to the keys.

Fig. 7 is a fragmentary view, showing the shifting lever rocked to its disconnecting position, wherein the shifting slide bar connected thereto holds the hooks out of engagement with the numeral keys, the shifting lever being moved to this position by the movement of the platen to a position corresponding to the writing of upper case characters.

Fig. 8 is a perspective view, showing a detail of the shifting lever and the connection of the compensating mechanism thereto.

Figure 1:
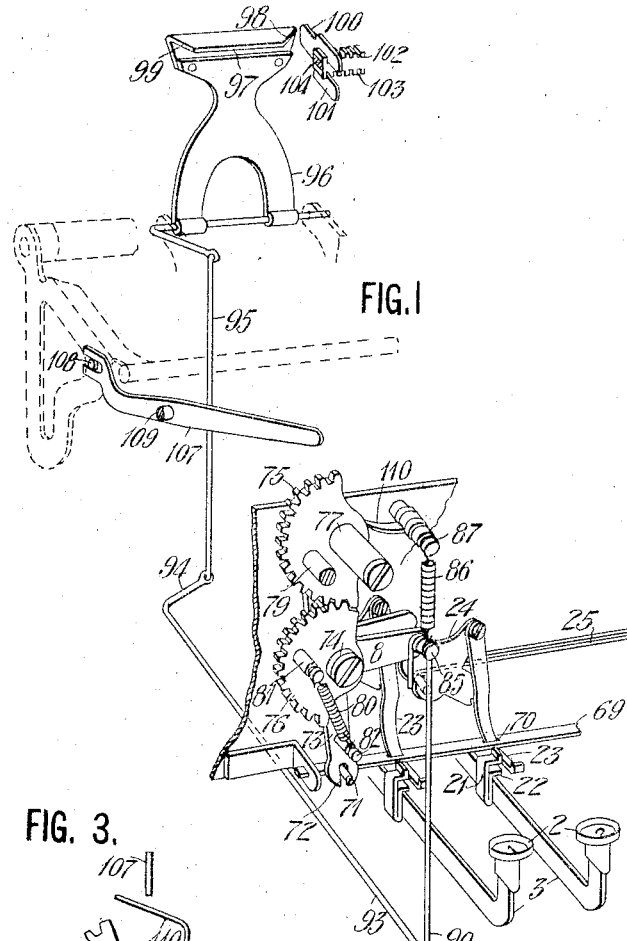
Figure 1 is a skeleton perspective view, showing the relation of certain elements to each other.
Figure 5:
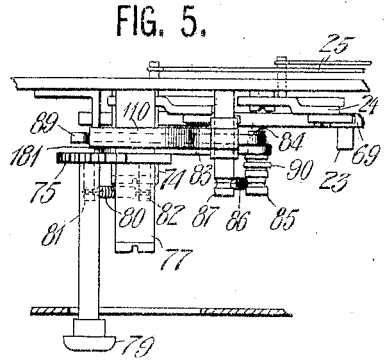
Fig. 5 is a detail top plan view of the mechanism shown in Figs. 3 and 4, with the parts in the position illustrated in Fig. 4.

Referring more particularly to the separate parts of this invention as embodied in the form shown in the drawings, 1 indicates letter keys and 2 numeral keys, which are secured to key levers 3 which actuate, through the intermediary of rockers 4, type bars 5, so as to swing the latter up rearwardly against the front side of a platen 6, which is rotatably mounted on the platen frame 7. The platen frame 7 is hung by means of hooks 8 on the frame of the carriage 9, so that it may swing from lower position, corresponding to the writing of lower case characters, to an upper position, corresponding to the writing of upper case characters. To accomplish the shift from lower to upper case, the platen frame 7 is provided with a roller 10, which rests on a shift rail 11 secured to a pivotally mounted shift frame 13. The shift frame 13 is actuated in the usual manner from one or more shift keys 14, which are secured to shift key levers 15, each having an arm 16 which bears against the shift frame 13, and is adapted to rock the same so as to elevate the rail 11 and thus the platen frame 7 at each actuation of either of the shift keys 14.

The carriage 9 normally tends to feed in a letter-spacing direction under the pull of a spring barrel 17, and is controlled in its movement by an escapement mechanism, indicated generally at 18, which may be of the usual Underwood type, wherein the carriage is permitted to jump a letter space step at each actuation of a key.

The numeral keys 2 may actuate a valuating escapement mechanism or indexing device, indicated generally at 19, so as to control the computing of one or more computing heads 20. To accomplish this, the numeral keys may be provided with any suitable form of coupling means, such as a pair of jaws 21 and 22 spaced apart from each other and open at one side so as to receive, in the case of each numeral key, a hook 23. Each of the hooks 23 is pivotally mounted on a bell crank or rocker 24, so that when a key is actuated and a hook 23 is in engagement therewith, the rocker 24 will be manipulated to draw on a rod 25, which is connected at its forward end to a bell crank 26 pivoted at 27 so as to plunge a jack 28 against one of a series of pins 29 movably mounted on a valuating wheel 30. There is one of these jacks for each of the numeral keys "1" to "9." Their action is such that each will force the opposed pin 29 through the valuating wheel 30, so that it projects on the opposite side thereof and will come in engagement with an escapement wheel 31 when the valuating wheel 30 is permitted to rotate by the release of the escapement wheel 31, which is normally held by a larger four-toothed escapement wheel 32 engaging with one of a pair of detent lugs 33 on a rock shaft 34. The rock shaft 34 is actuated at each manipulation of one of the numeral keys "1" to "9," so as to permit the escapement of the wheels 31 and 32, and thus bring the next projected pin in engagement with the escapement wheel 31, whereby the valuating wheel 30 has been permitted to rotate an amount corresponding to the particular numeral key struck. The rocking of the shaft 34 may be accomplished by the bell cranks 26 engaging a collar 120 and pressing the same to one side against the tension of a spring 121, so as to rock a lever 122 connected to this collar and also connected to an arm 123 on the rock shaft 34 through the intermediary of a link 125. The spring 121 will return the collar and the rock shaft 34 after the pressure on the numeral key has been removed.

The valuating wheel 30 has connected thereto a gear 35 which meshes with a corresponding gear 36 driven by a bevel gear 37. The bevel gear 37 meshes with bevel gears 38 and 39 on shafts 40 and 41 respectively. The shaft 41 is driven by a motor 42 through the intermediary of a slip clutch (not shown) and intermeshing bevel gears 43 and 44, the latter of which is on the shaft 41. The shaft 40 is also provided with a bevel gear 45 meshing with a bevel gear 46 on a shaft 47.

The shaft 47 is provided at its upper end with a bevel gear 48 meshing with a bevel gear 49 on a master wheel shaft 50. A master wheel 51, mounted on the shaft 50 in such manner as to be rotated thereby, is brought successively into engagement with internal gears 53 of a series of computing wheels 52 by a step-by-step movement corresponding to the step-by-step movement of the typewriter carriage 9. Such relative movement may be effected by mounting the computing wheels in a movable carriage which may be connected to the typewriter carriage, as shown, for example, in my prior Patent, No. 1,020,082, granted March 12, 1912. Means for causing such step-by-step movement of the typewriter carriage and computing mechanism is common to Underwood-Wright machines, and, in view of the description in the above-mentioned patent, it is deemed necessary to specifically describe the same in this application.

Each of the computing wheels 52, however, is provided with an external gear 54, so as to drive gears 55 carrying number bearing dial wheels 56 which are adapted to expose their numbers as turned up through a slot 57 in the computing head casing 58.

A complete rotation of each of the computing wheels 52 may be carried to the next higher computing wheel by tens carrying mechanism, indicated generally at 59, which *per se* forms no part of my invention, and so will not be particularly described at this point. It is sufficient to say, however, that this tens carrying mechanism obtains its drive, through the intermediary of gearing 200, from a shaft 60 which is provided with a bevel gear 61 meshing with a corresponding bevel gear 62 on a shaft 63. The shaft 63 is driven from a shaft 64 by meshing bevel gears 65 and 66. The shaft 64 in turn receives its motion from the shaft 41, through meshing bevel gears 67 and 68.

We now come to the particular part of this invention which is considered to be new in the art. The hooks 23 may be manipulated simultaneously into and out of coöperation with the jaws 21 and 22, and thus into and out of connection with the numeral keys by means of a shifting bar 69, which forms a part of the shifter and is provided with openings 70 through which the hooks 23 extend. The bar 69 is provided with a pin 71 which engages a slot 72 in a shifting lever 73, so that the latter can manipulate the bar 69 when it is rocked about its pivot, indicated at 74.

The shifting lever 73, which forms an element of the shifter, is not itself directly operated manually. To enable the operation of the shifting lever 73 there is provided a manual controller, which in this instance is shown in the form of a pair of coöperating sector gears 75 and 76 mounted on pivot pins 77 and 74. One of these sector gears 75 is provided with a handle or button 79, which extends to the front of the machine where it can be readily manipulated to change the position of the parts of the controller, and thus change the action of the controller.

When the parts of the controller are in the position indicated in Figs. 1, 3, 4 and 5, a spring 80, which is attached at its ends to pins 81 and 82 located respectively on the sector gear 76 and the shifting lever 73, will be under a tension tending to draw the sector gear 76 and the shifting lever 73 toward each other. The sector gear 76, however, is prevented from movement in such a direction by means of a stop 181, shown in the form of a pin secured to the sector gear 76, and engaging a toe 182 on a lever 83, which forms a part of the compensating or opposing mechanism, and which is shown to be loosely mounted on the pivot 74 on which the shifting lever 73 is also loosely mounted.

The movement of the shifting lever 73 is also prevented by a stop arm 84 thereon overlying and engaging a pin 85 on the compensating lever 83. The pin 85 has secured thereto a spring 86, which is secured at its upper end to a fixed pin 87. The spring 86 is stronger than the spring 80, so that it prevents the movement of the shifting lever 73, under the pull of the spring 80 by holding the compensating lever 83 immovable against the pull brought thereon through the stop arm 84. It will be seen, however, that the movement of the shifting lever 73, in the direction of pull of the spring 86 and thus the movement of the floating interponent or compensating lever 83, under the pull of the spring 86, is limited by one arm 88 of the upper bifurcated end of the shifting lever 73 engaging the pivot 77 or the extension thereof, as indicated in Figs. 6 and 7. The other arm 89 of the bifurcation will likewise limit the movement of the shifting lever 73 in the opposite direction, as indicated in Fig. 3.

Figure 3:
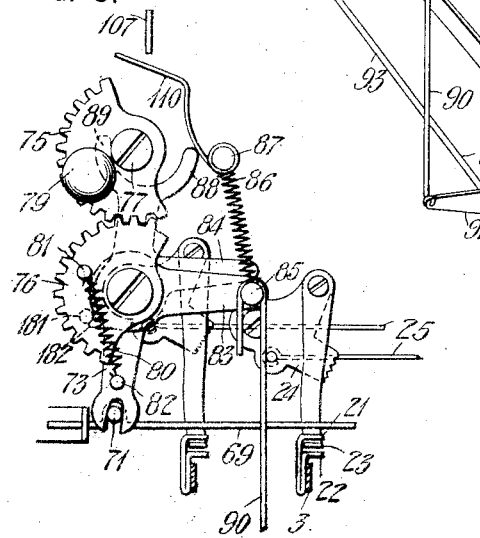
Fig. 3 is an enlarged detail view, showing the manual controller in its active position, and also showing the carriage-controlled mechanism actuated to bring the hooks into active connection with the numeral keys.
Figure 4:
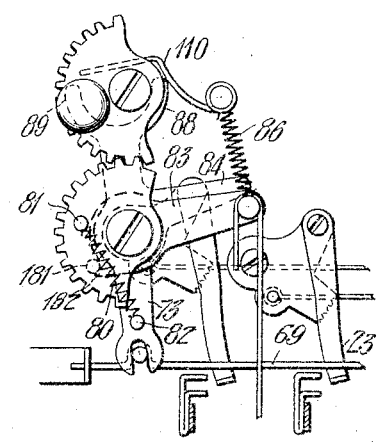
Fig. 4 is a view similar to Fig. 3, showing the parts in the same position with the exception that the carriage-controlled mechanism is not actuated to bring the hooks into engagement with the numeral keys.

In order to do any computing it is necessary to overcome the opposition of the spring 86, and thus permit the spring 80 to manipulate the shifting lever 73 from the position indicated in Fig. 1 to the position indicated in Fig. 3. For this purpose an automatic control by the typewriter carriage is provided. The pin 85 has connected thereto a link 90, which is secured at its lower end to an arm 91 of a bell crank lever 92, a portion of which is formed by a shaft 93 extending rearwardly where it is provided with a second arm 94. The arm 94 is connected by a link 95 to a controlling bell crank lever 96 operated by the typewriter carriage. This controlling bell crank lever 96 for the purpose of having the typewriter carriage operate it is provided with a bearing surface 97 having inclined cam surfaces 98 and 99 adapted to permit the bell crank 96 to be thrust rearwardly by an extension 100 of one or more tappets 101 on the typewriter carriage, and in so doing rock the bell crank 96 so as to pull down on the pin 85 through the connecting linkages. The tappets 101 may be arranged at any desired intervals in paired slots 102 and 103 located at letter space intervals on a rack 104. This rack 104 is secured so as to move with the carriage 9, and may be the usual column stop rack so that the tappets 101 may act as column stops, and, by engagement with column stop plungers or counter stops 105, determine the position of the carriage 9 when said counter stops are actuated by column key levers 106 in a manner common to the Underwood typewriter.

Even while the bearing surface 97 is in engagement with one of the tappets 101, so that the typewriter carriage tends to make the hooks 23 engage the numeral keys 2, the hooks 23 can be disconnected from the numeral keys 2 at such times as it may be desired, as for example, when the platen frame is shifted from its lower to its upper position, in which upper case position the characters written with the numeral keys are not numbers, so that to avoid errors the numeral keys should not operate the computing mechanism. To accomplish this, the shifting frame 13 is connected to a lever 107 by a pin-and-slot connection 108, so that the lever 107 will be rocked about its pivot 109, whereby its forward end will be depressed when the platen is shifted to upper-case position, so as to bend a throw-out 110 into engagement with the arm 88 of the shifting lever 73, with the result that said shifting lever 73 may be forced from the position indicated in Fig. 3 to the position indicated in Fig. 7. The throw-out 110 is shown in the form of a cam arm loosely mounted between collars on the pin 87, and bent so as to be readily engaged by the lever 107 and so as to readily engage the fork or arm 88 of the shifting lever 73. Such a movement of the shifting lever 73 may occur when the sector gears 75 and 76 are in the position shown in Figs. 1, 4 and 5, (in which conditions the movement is idle), and even when the shifting lever 73 is in the position shown in Fig. 3, in which latter case the shifting lever can be moved against the tension of the spring 80 and then disconnects the hooks 23 by forcing the shifting bar 69 from the position indicated in Fig. 3 to the position indicated in Figs. 6 and 7.

The controller can be actuated so that it will hold the hooks 23 out of connection with the numeral keys 2. To do this, it is merely necessary to rotate sector gears 75 and 76 from the position shown in Figs. 1, 3, 4 and 5 to the position shown in Fig. 6, in which position the sector gears will be locked by the spring 80 being shifted to the other side of the pivot 74, and tending to pull the shifting lever 73 and the sector gear 76 toward each other. The movement of the sector gears 75 and 76 is however limited by providing at the ends thereof enlarged teeth 111 and 112, which, by engagement with each other and with the smaller spaces between the teeth, will prevent the further movement of the sector gears. The stop 181 will be shifted to the position indicated in Fig. 6, so that it will be out of engagement with the toe 182, and therefore there will be no pull on the gear sectors 75 and 76. The spring 86 however will still act, through the intermediary of the pin 85 and the stop arm 84, to force the shifting lever 73 into the position indicated in Figs. 4 and 6. Even if the carriage-controlled mechanism should be actuated, as indicated in Fig. 6, there will therefore be no tendency to bring the shifting lever from its disconnecting position to its connecting position so that the typewriting mechanism can be actuated without actuating the computing mechanism.

In the operation of the device, if it is desired to use the computing mechanism as well as the typewriting mechanism, the controller is manipulated so that its parts occupy the position indicated in Figs. 1, 3, 4 and 5, in which the spring 80 will be under a tension normally tending to shift the shifting lever 73 and thus the bar 69, so as to bring the hooks 23 into connection with the numeral keys 2. This action, however, is prevented by the spring 86, which is stronger, pulling on the arm 84, through the intermediary of the pin 85, and thus holding the hooks in the position indicated in Figs. 1 and 4. As soon as the carriage has been moved either by actuation of character keys or tabulating keys to a position corresponding to a column on the work sheet in which it is desired to compute, then one of the tappets 101, which has been previously placed in a corresponding position in the rack 104, will come in engagement with the controlling lever 96, so as to force the same away from the rack 104 until the bearing surface 97 engages the extension 100. This movement will, through the intermediary of the connecting linkages, pull down on the pin 85 against the tension of the spring 86, whereby the latter will no longer be opposed in its pull to the tension of the spring 80 and to the movement of the shifting lever 84, and further whereby the tension on the spring 80 will be increased by the toe 182 forcing the stop 181 and thus the sector gear 76 farther away from the pin 82. It will thus be seen that not only is the tension on the spring 86 overcome, but the tension on the spring 80 is aided to positively draw the hooks 23 into engagement with the jaws 21 and 22 and thus complete the connection between the computing mechanism and the numeral keys of the typewriting mechanism.

If it should be desired to use the numeral keys, or any of the other keys for that matter, to write upper case characters, then one of the shift keys 14 can be actuated to rock the shifting frame 13 so that it elevates the platen frame 7 to a position corresponding to the writing of upper case characters. The movement of the shifting frame 13 will rock the lever 107 so as to depress its forward end and thus force the throw-out 110 to the position indicated in Fig. 7, wherein it will have forced the shifting lever 73 from the position indicated in Fig. 3 to the position indicated in Fig. 7. This may often happen while the compensating lever 83 is in the position indicated in Fig. 3, as the spring 80 will expand to permit the shifting lever 73 to move from the position indicated in Fig. 3 to the position indicated in Fig. 7.

If it is desired to use the typewriting mechanism without the computing mechanism, it is merely necessary to shift the parts of the controller from the position indicated in Fig. 1 to the position indicated in Fig. 6, wherein there will be no tendency of the spring 80 to draw the hooks 23 into engagement with the jaws 21 and 22, and in fact the tension of this spring 80 will act to hold the shifting lever 73 in the position indicated in Fig. 6, corresponding to the disconnected relation of the hooks 23 with respect to the numeral keys 2. Even though the tappets 101 should actuate the controlling lever 96, the spring 86 would merely be expanded and there would be no force tending to connect the hooks 23 with the numeral keys 2.

Variations may be resorted to within the scope of the invention, and portions of the improvements may be used without others.

Having thus described my invention, I claim:

1. The combination with typewriting mechanism including numeral keys, of computing mechanism connectible to be actuated by said numeral keys, means tending to accomplish the connection of said computing mechanism with said keys, and means of greater effect opposing said first-mentioned means and preventing the connection thereby of said computing mechanism with said keys.

2. The combination with typewriting mechanism including numeral keys, of computing mechanism connectible to be actuated by said numeral keys, means tending to accomplish the connection of said computing mechanism with said keys, means of greater effect opposing said first-mentioned means and preventing the connection thereby of said computing mechanism with said keys, and means for overcoming the opposition of said second-mentioned means.

3. The combination with typewriting mechanism including numeral keys, of computing mechanism connectible to be actuated by said numeral keys, means tending to accomplish the connection of said computing mechanism with said keys, and means of greater effective force opposing said first-mentioned means and preventing the connection thereby of said computing mechanism with said keys, the last-mentioned means including a resilient controlling element.

4. The combination with typewriting mechanism including numeral keys and a traveling carriage, of computing mechanism connectible to be actuated by said numeral keys, means tending to accomplish the connection of said computing mechanism with said keys, means of greater effective force opposing said first-mentioned means and preventing the connection thereby of said computing mechanism with said keys, and means operable by said carriage for overcoming the opposition of said second-mentioned means to thereby permit said first mentioned means to effect a connection between said keys and computing mechanism.

5. The combination with typewriting mechanism including numeral keys and a traveling carriage, of computing mechanism connectible to be actuated by said numeral keys, means tending to accomplish the connection of said computing mechanism with said keys, means of greater effective force opposing said first-mentioned means and normally preventing the connection thereby of said computing mechanism with said keys, and means operable by said carriage for overcoming the opposition of said second-mentioned means and thereby increasing the effective force of said first-mentioned means so that the latter means then effects connection of said keys and computing mechanism.

6. In a combined typewriting and computing machine, the combination of numeral keys, computing mechanism, connections between said numeral keys and said computing mechanism, a shifter for moving certain of said connections into and out of operative relation with the keys, a manual controller for determining the possibility of moving the connections into operative relation, said manual controller including intermeshing gears, means for moving said gears from one position to another, and a spring connecting one of said gears with said shifter to move said shifter in alternative directions, whereby said connections are moved into and out of operative relation with the keys.

7. In a combined typewriting and computing machine, the combination of numeral keys, computing mechanism, connections between said numeral keys and said computing mechanism, a shifter for moving certain of said connections into and out of operative relation with the keys, a manual controller for determining the possibility of moving the connections into operative relation, said manual controller including intermeshing gears, means for moving said gears from one position to another, a spring connecting one of said gears with said shifter to move said shifter in alternative directions, whereby said connections are moved into and out of operative relation with the keys, and a second spring of greater effective force than the first-mentioned spring, to oppose the action of the first-mentioned spring.

8. In a combined typewriting and computing machine, the combination of numeral keys, computing mechanism, connections between said numeral keys and said computing mechanism, a shifter for moving certain of said connections into and out of operative relation with the keys, a manual controller for determining the possibility of moving the connections into operative relation, said manual controller including intermeshing gears, means for moving said gears from one position to another, a spring connecting one of said gears with said shifter to move said shifter in alternative directions, whereby said connections are moved into and out of operative relation with the keys, a second spring of greater effective force than the first-mentioned spring, to oppose the action of the first-mentioned spring, and means for overcoming the stress of said second spring, to permit the first-mentioned spring to act.

9. In a combined typewriting and computing machine, the combination of numeral keys, computing mechanism, connections between said numeral keys and said computing mechanism, a shifter for moving certain of said connections into and out of operative relation with the keys, a manual controller for determining the possibility of moving the connections into operative relation, said manual controller including intermeshing gears, means for moving said gears from one position to another, a spring connecting one of said gears with said shifter to move said shifter, said spring tending, in certain positions of said controller, to move said shifter in the direction for effecting joinder of said connections, a second spring of greater effective force than the first-mentioned spring opposing the action of the first-mentioned spring, and means for counteracting the force of the second spring and simultaneously increasing the force of the first-mentioned spring, to permit the first-mentioned spring to move said shifter.

10. In a combined typewriting and computing machine, the combination of numeral keys, a case-shift mechanism to effect change between upper and lower case characters, computing mechanism, connections between said numeral keys and said computing mechanism, a shifter for moving certain of said connections into and out of operative relation with the keys, a manual controller for determining the possibility of moving the connections into operative relation, a spring for moving said shifter to move said connections to operative relation, a second spring stronger than the first spring and normally overcoming said first spring so that said connections are inoperative, a carriage controlled means for overcoming said second spring to permit said first spring to connect said keys and computing mechanism and means controlled from said case-shift mechanism to move said connections irrespective of the carriage control.

11. In a combined typewriting and computing machine, the combination of numeral keys, a case-shift mechanism to effect change between upper and lower case characters, computing mechanism, connections between said numeral keys and said computing mechanism, a shifter for moving certain of said connections into and out of operative relation with the keys, a manual controller for determining the possibility of moving the connections into operative relation, said manual controller including intermeshing gears, means for moving said gears from one position to another, a spring connecting one of said gears with said shifter to move said shifter, said spring, in certain positions of said gears, being under tension tending to move said shifter to move the connections into operative relation with the keys, a lever being connected to said case-shift mechanism, and a throwout device operable by said lever to move said shifter against the tension of said spring to effect movement of the connections to inoperative relation.

12. In a combined typewriting and computing machine, the combination of numeral keys, computing mechanism, connections between said numeral keys and said computing mechanism, a shifter bar for moving certain of said connections into and out of operative relation with the keys, a lever for moving said bar, a manual controller for determining the possibility of moving the connections into operative relation, said manual controller including intermeshing gears, means for moving said gears from one position to another, a spring connecting one of said gears with said lever to move said shifter, said spring, in certain positions of said gears, being under tension tending to move said lever and bar to move the connections into operative relation with the keys, a stop for preventing movement of said gears from said position under the tension of said spring, a second lever engaging said stop, an arm on the first-mentioned lever, and means operating between said arm and said second lever, tending to prevent movement of said gears relatively to the first lever, under the tension of said spring.

13. In a combined typewriting and computing machine, the combination of numeral keys, computing mechanism, connections between said numeral keys and said computing mechanism, a shifter bar for moving certain of said connections into and out of operative relation with the keys, a lever for moving said bar, a manual controller for determining the possibility of moving the connections into operative relation, said manual controller including intermeshing gears, means for moving said gears from one position to another, a spring connecting one of said gears with said lever to move said shifter, said spring, in certain positions of said gears, being under tension tending to move said lever and bar to move the connections into operative relation with the keys, a stop for preventing movement of said gears from said position under the tension of said spring, a second lever engaging said stop, an arm on the first-mentioned lever, means operating between said arm and said second lever, tending to prevent movement of said gears relatively to the first lever, under the tension of said spring, and a second spring connected to the second lever to counteract the tendency of movement of the first-mentioned lever by the first-mentioned spring.

14. In a combined typewriting and computing machine, the combination of numeral keys, computing mechanism, connections between said numeral keys and said computing mechanism, a shifter bar for moving certain of said connections into and out of operative relation with the keys, a lever for moving said bar, a manual controller for determining the possibility of moving the connections into operative relation, said manual controller including intermeshing gears, means for moving said gears from one position to another, a spring connecting one of said gears with said lever to move said shifter, said spring, in certain positions of said gears, being under tension tending to move said lever and bar to move the connections into operative relation with the keys, a stop for preventing movement of said gears from said position under the tension of said spring, a second lever engaging said stop, an arm on the first-mentioned lever, means operating between said arm and said second lever, tending to prevent movement of said gears relatively to the first lever, under the tension of said spring, a second spring connected to the second lever to counteract the tendency of movement of the first-mentioned lever by the first-mentioned spring, and means for automatically moving said second lever against the tension of said second spring, to permit the movement of the first lever.

15. In a combined typewriting and computing machine, the combination of numeral keys, computing mechanism, connections between said numeral keys and said computing mechanism, a shifter bar for moving certain of said connections into and out of operative relation with the keys, a lever for moving said bar, a manual controller for determining the possibility of moving the connections into operative relation, said manual controller including intermeshing gears, means for moving said gears from one position to another, and a spring connecting one of said gears with said lever to move said shifter in alternative directions, whereby said connections are moved into and out of operative relation with the keys; said gears being movable from a position tending to pull said lever in one direction through the intermediary of said spring, to a position tending to pull said lever in the opposite direction through the intermediary of said spring.

16. The combination with a typewriting mechanism including a plurality of numeral keys, of a computing mechanism including connections for subjecting the control of said computing mechanism to said keys through the operative joinder of said connections with said keys, a shifting bar for moving certain parts of said connections to effect the joinder and disjoinder of said connections with and from said keys, a shifting lever for moving said bar, means for limiting the movement of said shifting lever in both directions, a pair of intermeshing gears, and a spring having points of connection with said lever and one of said gears, said spring normally tending to draw said points of connection together.

17. The combination with a typewriting mechanism including a plurality of numeral keys, of a computing mechanism including connections for subjecting the control of said computing mechanism to said keys through the operative joinder of said connections with said keys, a shifting bar for moving certain parts of said connections to effect the joinder and disjoinder of said connections with and from said keys, a shifting lever for moving said bar, means for limiting the movement of said shifting lever in both directions, a pair of intermeshing gears, a spring having points of connection with said lever and one of said gears, said spring normally tending to draw said points of connection together, and pivots for said gears about which the gears are rotatable to change the relative position of said points of connection so as to change the direction of pull between one of said gears and said lever under the tension of said spring.

18. The combination with a typewriting mechanism including a plurality of numeral keys, of a computing mechanism including connections for subjecting the control of said computing mechanism to said keys through the operative joinder of said connections with said keys, a shifting bar for moving certain parts of said connections to effect the joinder and disjoinder of said connections with and from said keys, a shifting lever for moving said bar, means for limiting the movement of said shifting lever in both directions, a pair of intermeshing gears, a spring having points of connection with said lever and one of said gears, said spring normally tending to draw said points of connection together, and means for limiting the relative movement of said lever and one of said gears.

19. The combination with a typewriting mechanism, and a plurality of numeral keys, of a computing mechanism including connections for subjecting the control of said computing mechanism to said keys through the joinder of said connections with said keys, a shifting bar for moving certain parts of said connections into and out of operative relation, a shifting lever for moving said bar, a spring normally tending to move said shifting lever, a lever, engaging means between said shifting lever and said second-mentioned lever, and a spring connected to said second-mentioned lever so as to hold said first-mentioned lever against movement under the pull of said first-mentioned spring.

20. The combination with typewriting mechanism including a plurality of numeral keys, of computing mechanism including connections for subjecting the control of said computing mechanism to said keys, a shifting lever for effecting joinder and disjoinder of said connections with and from said keys, a spring connected to said lever, a sector gear connected to said spring, a second sector gear meshing with said first-mentioned sector gear, said sector gears being movable to change the direction of pull of said spring between said lever and said first-mentioned sector gear, a stop on said first-mentioned sector gear, a lever engaging said stop, a spring connected to said second-mentioned lever, a pin on said second-mentioned lever, and an arm on said first-mentioned lever engaging said pin so as to render said shifting lever subservient to the action of said second-mentioned spring.

21. The combination with typewriting mechanism including a plurality of numeral keys, of computing mechanism including connections for subjecting the control of said computing mechanism to said keys, a shifting lever for effecting joinder and disjoinder of said connections with and from said keys, a spring connected to said lever, a sector gear connected to said spring, a second sector gear meshing with said first-mentioned sector gear, said sector gears being movable to change the direction of pull of said spring between said lever and said first-mentioned sector gear, a stop on said first-mentioned sector gear, a lever engaging said stop, a second and stronger spring connected to said second-mentioned lever able to overcome the first spring, a pin on said second-mentioned lever, and an arm on said first-mentioned lever engaging said pin so as to render said shifting lever subservient to the action of said second-mentioned spring.

22. The combination with typewriting mechanism including a plurality of numeral keys, of computing mechanism including connections for subjecting the control of said computing mechanism to said keys, a shifting lever for effecting joinder and disjoinder of said connections with and from said keys, a spring connected to said lever, a sector gear connected to said spring, a second sector gear meshing with said first-mentioned sector gear, said sector gears being movable to change the direction of pull of said spring between said lever and said first-mentioned sector gear, a stop on said first-mentioned sector gear, a lever engaging said stop, a spring connected to said second-mentioned lever, a pin on said second-mentioned lever, an arm on said first-mentioned lever engaging said pin so as to render said shifting lever subservient to the action of said second-mentioned spring; said shifting lever being bifurcated, and a pin engaging the crotch of said bifurcation to limit the swinging of said shifting lever.

23. The combination with typewriting mechanism including a plurality of numeral keys, of computing mechanism including connections for subjecting the control of said computing mechanism to said keys, a shifting lever for effecting joinder and disjoinder of said connections with and from said keys, a spring connected to said lever, a sector gear connected to said spring, a second sector gear meshing with said first-mentioned sector gear, said sector gears being movable to change the direction of pull of said spring between said lever and said first-menitoned sector gear, a stop on said first-mentioned sector gear, a lever engaging said stop, a spring connected to said second-mentioned lever, a pin on said second-mentioned lever, an arm on said first-mentioned lever engaging said pin so as to render said shifting lever subservient to the action of said second-mentioned spring; said shifting lever being bifurcated, a pin engaging the crotch of said bifurcation to limit the swinging of said shifting lever, and an automatic control connected to said second-mentioned lever and operated to move said second-mentioned lever against the tension of said second-mentioned spring, to cause a movement of said first-mentioned gear with said shifting lever by engaging with said stop.

24. The combination with a typewriting mechanism including a plurality of numeral keys, of a computing mechanism including connections for subjecting the control of said computing mechanism to said typewriting keys by operative joinder thereof, a shifting bar for moving certain parts of said connections to effect such joinder, a shifting lever for moving said bar, a pair of springs tending, under certain conditions, to move said lever in opposite directions, and a control for determining which of said springs shall be most effective.

25. The combination with a typewriting mechanism including a plurality of numeral keys and a shiftable platen movable to effect the change between upper and lower case characters, of a computing mechanism including connections for subjecting the control of said computing mechanism to said numeral keys, a shifting lever for moving certain parts of said connections to effect the subservience of said computing mechanism to said numeral keys, a control for effecting the movement of said lever to cause the joinder of said connections with said numeral keys, a cam arm movable into engagement with said lever so as to operate the same and thereby cause the disjoinder of said connections from said numeral keys, and a lever operated by the shifting of said platen to shift said cam arm into such engagement.

26. The combination with a typewriter mechanism including a plurality of numeral keys, of computing mechanism including connections for subjecting the control of said computing mechanism to said keys, a shifter for moving certain parts of said connections into and out of operative joinder with said keys, a manual controller for determining the possibility of joinder of said connections with said keys, said manual controller including intermeshing gears and means for moving said gears from one position to another, a spring connecting one of said gears with said shifter, said spring tending, in certain positions of said controller, to move said shifter in the direction to effect a joinder of said connections with said keys, a spring of greater effective force than said first-mentioned spring opposing the action of said first-mentioned spring, and means for increasing the force of said first-mentioned spring to enable said first-mentioned spring to move said shifter.

27. The combination with a typewriter mechanism including a plurality of numeral keys, of computing mechanism including connections for subjecting the control of said computing mechanism to said keys, a shifter for moving certain parts of said connections into and out of operative joinder with said keys, a manual controller for determining the possibility of joinder of said connections with said keys, said manual controller including intermeshing gears and means for moving said gears from one position to another, a spring connecting one of said gears with said shifter, said spring tending, in certain positions of said controller, to move said shifter in the direction to effect a joinder of said connections with said keys, a spring of greater effective force than said first-mentioned spring opposing the action of said first-mentioned spring, means for increasing the force of said first-mentioned spring to enable said first-mentioned spring to move said shifter; said typewriting mechanism also including a platen shiftable to provide for the change between upper and lower case characters, and a throw-out operated at the shifting of said platen to move said shifter against the tension of said first-mentioned spring.

28. The combination with a typewriting mechanism, of a computing mechanism, connections between the typewriting mechanism and the computing mechanism to effect the control of the computing mechanism from the typewriting mechanism, and means for controlling the effectiveness of said connections, including a plurality of moving parts also having a movement relative to each other, and spring means for so joining said parts together as to tend to cause relative movement thereof and thus modify the condition of effectiveness of said connections.

29. The combination with a typewriting mechanism, of a computing mechanism, connections between the typewriting mechanism and the computing mechanism to effect the control of the computing mechanism from the typewriting mechanism, and means for controlling the effectiveness of said connections, including a plurality of moving parts also having a movement relative to each other and spring means for so joining said parts together as to tend to cause relative movement thereof and thus modify the condition of effectiveness of said connections, said parts being adjustable to vary the direction of effective traction of said spring means.

30. The combination with a typewriting mechanism, of a computing mechanism, connections between the typwriting mechanism and the computing mechanism to effect the control of the computing mechanism from the typewriting mechanism, means for controlling the effectiveness of said connections, including a plurality of moving parts also having a movement relative to each other, spring means for so joining said parts together as to tend to cause relative movement thereof and thus modify the condition of effectiveness of said connections, and a spring fixed at one end and so connected to one of said parts at its other end as to oppose the action of said first mentioned spring means.

31. The combination with a computing mechanism, of a typewriting mechanism, connections providing for the control of said computing mechanism from said typewriting mechanism, a shifting lever for effecting said connections, an interponent for controlling the movement of said shifting lever, said interponent contacting directly with said shifting lever for a movement in one direction, and yielding connections between said interponent and said shifting lever for effecting a movement in the opposite direction.

32. The combination with a computing mechanism, of a typewriting mechanism, connections providing for the control of said computing mechanism from said typewriting mechanism, a shifting lever for controlling the movement of said connections, an interponent for manipulating said shifting lever, said interponent contacting directly with said shifting lever for a movement in one direction, and yielding connections between said interponent and said shifting lever for effecting a movement in the opposite direction, said interponent having a loose connection with said yielding connections so as to permit a relative movement between said yielding connections and said interponent.

33. The combination with a computing mechanism, of a series of numeral keys for actuating said computing mechanism, shifting means for determining the activity of said computing mechanism, controlling means for actuating said shifting means to render said computing mechanism active, a yielding link connecting said controlling means with said shifting means so that said shifting means may be positively actuated at times to bring said computing mechanism into play, and so that said yielding link may give when a greater force is opposed thereto to cause the computing mechanism to be inactive and to overcome the tendency of said controlling means to render said computing means active, and mechanism for exerting a greater force on said yielding link than is exerted by said controlling means.

34. The combination with a computing mechanism, of a series of numeral keys for actuating said computing mechanism, shifting means for determining the actuation of said computing mechanism by said numeral keys, a pair of sector gears for operating said shifting means, means for limiting the relative movement of the sector gears for determining the extremities of their oscillations, and a spring for holding said sector gears in either of their extreme positions.

35. The combination with a computing mechanism, of a series of numeral keys for actuating said computing mechanism, shifting means for determining the actuation of said numeral keys by said computing mechanism, a pair of sector gears for operating said shifting means, means for limiting the relative movement of the sector gears for determining the extremities of their oscillations, and controlling means for modifying the action of said sector gears on said shifting means at one extreme position of said gears, and incapable of modifying the action of said gears at the other extreme position of said gears.

36. The combination with a numeral-key-controlled computing mechanism, of a pair of intermeshing gears, means for limiting relative movement of said gears, means for coupling said numeral keys to said computing mechanism, and flexible connections between said coupling means and said gears for rendering the activity of said computing mechanism subservient to said gears.

37. In a combined typewriting and computing machine, the combination of numeral keys, computing mechanism, connections between said numeral keys and said computing mechanism, a shifter for moving certain of said connections into and out of operative relation with the keys, a rocker, and a spring connecting said rocker and said shifter and tending in one position of the rocker to pull said shifter in a direction to move the connections into operative relation, and tending in the other position of the rocker to pull said shifter in the opposite direction, and thereby effect movement of the shifter to effect disconnection of the keys.

38. In a combined typewriting and computing machine, the combination of numeral keys, computing mechanism, connections between said numeral keys and said computing mechanism, a pivotally-mounted shifter for moving certain of said connections into and out of operative relation with the keys, a rocker loosely mounted on the same pivot as said shifter, and a spring connecting said rocker and said shifter and having its point of attachment to said rocker movable from side to side of said pivot, so as to rock said shifter first in one direction and then in the other, thereby to control alternate connection and disconnection.

39. In a combined typewriting and computing machine, the combination of numeral keys, computing mechanism, connections between said numeral keys and said computing mechanism, a pivotally-mounted shifter for moving certain of said connections into and out of operative relation with the keys, a rocker loosely mounted on the same pivot as said shifter, a spring connecting said rocker and said shifter and having its point of attachment to said rocker movable from side to side of said pivot, so as to rock said shifter first in one direction and then in the other, thereby to control alternate connection and disconnection, and a second spring of greater effective force than the first-mentioned spring and opposed to said first-mentioned spring and normally nullifying its action.

40. In a combined typewriting and computing machine, the combination of numeral keys, computing mechanism, connections between said numeral keys and said computing mechanism, a shifter for moving certain of said connections into and out of operative relation with the keys, a rocker, a spring connecting said rocker and said shifter and tending in one position of the rocker to pull said shifter in a direction to move the connections into operative relation, and a compensating rocker engageable with the first-named rocker to nullify the action of said spring.

41. In a combined typewriting and computing machine, the combination of numeral keys, computing mechanism, connections between said numeral keys and said computing mechanism, a shifter for moving certain of said connections into and out of operative relation with the keys, a rocker, a spring connecting said rocker and said shifter and tending in one position of the rocker to pull said shifter in a direction to move the connections into operative relation, a compensating rocker engageable with the first-named rocker to nullify the action of said spring, and a second spring of greater effective force than the first-named spring and connected to control the compensating rocker.

42. In a combined typewriting and computing machine, the combination of numeral keys, computing mechanism, connections between said numeral keys and said computing mechanism, a shifter for moving certain of said connections into and out of operative relation with the keys, a rocker, a spring connecting said rocker and said shifter and tending in one position of the rocker to pull said shifter in a direction to move the connections into operative relation, and a compensating rocker having a projection engageable with a stop on the first-named rocker, to hold the first-named rocker against movement and thereby nullify the action of said spring.

43. In a combined typewriting and computing machine, the combination of numeral keys, computing mechanism, connections between said numeral keys and said computing mechanism, a shifter for moving certain of said connections into and out of operative relation with the keys, a rocker, a spring connecting said rocker and said shifter and tending in one position of the rocker to pull said shifter in a direction to move the connections into operative relation, a compensating rocker having a projection engageable with a stop on the first-named rocker, to hold the first-named rocker against movement and thereby nullify the action of said spring, and a second spring of greater effective force than the first-named spring, connected to control the compensating rocker.

GUSTAVE O. DEGENER.

Witnesses:
PAUL ZIRON,
C. RIPLEY.